United States Patent
Iwashita et al.

(10) Patent No.: US 10,005,975 B2
(45) Date of Patent: Jun. 26, 2018

(54) FUEL SEPARATION METHOD

(71) Applicants: Yoshihiro Iwashita, Mishima (JP); Takanori Ueda, Susono (JP); Randall D. Partridge, Califon, NJ (US); Robert Lucchesi, Flemington, NJ (US); Paul O. Johnson, Corning, NY (US); George L. Kellogg, Hector, NY (US)

(72) Inventors: Yoshihiro Iwashita, Mishima (JP); Takanori Ueda, Susono (JP); Randall D. Partridge, Califon, NJ (US); Robert Lucchesi, Flemington, NJ (US); Paul O. Johnson, Corning, NY (US); George L. Kellogg, Hector, NY (US)

(73) Assignees: Toyota Jidosha Kabushiki Kaisha, Toyota (JP); Exxonmobil Research and Engineering Company, Clinton Township Annandale, NJ (US); Corning Incorporated, Corning, NY (US)

( * ) Notice: Subject to any disclaimer, the term of this patent is extended or adjusted under 35 U.S.C. 154(b) by 29 days.

(21) Appl. No.: 14/762,122

(22) PCT Filed: Jan. 18, 2013

(86) PCT No.: PCT/US2013/022176
§ 371 (c)(1),
(2) Date: Jul. 20, 2015

(87) PCT Pub. No.: WO2014/113020
PCT Pub. Date: Jul. 24, 2014

(65) Prior Publication Data
US 2015/0353853 A1    Dec. 10, 2015

(51) Int. Cl.
*C10L 1/18*    (2006.01)
*B01D 61/00*    (2006.01)
(Continued)

(52) U.S. Cl.
CPC ............... *C10L 1/18* (2013.01); *B01D 61/00* (2013.01); *B01D 61/362* (2013.01);
(Continued)

(58) Field of Classification Search
CPC combination set(s) only.
See application file for complete search history.

(56) References Cited

U.S. PATENT DOCUMENTS

| | | |
|---|---|---|
| 8,119,006 B2 | 2/2012 | Patil et al. |
| 2002/0139321 A1 | 10/2002 | Weissman et al. |

(Continued)

FOREIGN PATENT DOCUMENTS

| | | |
|---|---|---|
| JP | 2002156103 A | 5/2002 |
| JP | 2007-255226 A | 10/2007 |

(Continued)

*Primary Examiner* — Ellen McAvoy
*Assistant Examiner* — Chantel Graham
(74) *Attorney, Agent, or Firm* — Oliff PLC

(57) ABSTRACT

A fuel separation method by which auxiliary fuel is separated from blended gasoline fuel for a flexible fuel vehicle capable of using ethanol-blended gasoline fuel, the method including the following steps (a) and (b): (a) a step in which, when the ethanol concentration is low, the blended gasoline fuel is separated by a polar separating membrane member at a relatively high separation temperature to obtain, at the permeation side of the membrane, a first auxiliary fuel enriched with the aromatic gasoline components and ethanol component, and (b) a step in which, when the ethanol concentration is high, the blended gasoline fuel is separated by a polar separating membrane member at a relatively low second separation temperature to obtain, at the permeation side of the membrane, a second auxiliary fuel enriched with the non-aromatic high-volatile gasoline components.

8 Claims, 5 Drawing Sheets

(51) Int. Cl.
*B01D 61/36* (2006.01)
*F02D 19/06* (2006.01)
*C10L 1/182* (2006.01)

(52) U.S. Cl.
CPC ..... *F02D 19/0655* (2013.01); *F02D 19/0671* (2013.01); *B01D 2311/08* (2013.01); *B01D 2311/25* (2013.01); *C10L 1/1824* (2013.01); *C10L 2270/023* (2013.01); *C10L 2290/548* (2013.01); *Y02T 10/36* (2013.01)

(56) References Cited

U.S. PATENT DOCUMENTS

| | | |
|---|---|---|
| 2007/0234976 A1 * | 10/2007 | Dearth ............... F02M 26/36 123/2 |
| 2008/0011680 A1 | 1/2008 | Partridge et al. |
| 2009/0159057 A1 | 6/2009 | Pursifull et al. |
| 2010/0108605 A1 | 5/2010 | Patil et al. |
| 2011/0204059 A1 | 8/2011 | Kamio et al. |
| 2011/0300355 A1 | 12/2011 | Katsube |
| 2012/0270958 A1 | 10/2012 | Shaffer et al. |

FOREIGN PATENT DOCUMENTS

| | | |
|---|---|---|
| JP | 2009133212 A | 6/2009 |
| JP | 2009150397 A | 7/2009 |
| JP | 2011122544 A | 6/2011 |
| JP | 2011174391 A | 9/2011 |

* cited by examiner

FUEL SEPARATION METHOD

TECHNICAL FIELD

The present invention relates to a fuel separation method for a flexible fuel vehicle, and particularly to a fuel separation method whereby auxiliary fuel is separated from an ethanol-blended gasoline fuel.

BACKGROUND ART

In recent years, internal combustion engines have become known that use multiple types of fuel. Vehicles in which such internal combustion engines are mounted are known as flexible fuel vehicles (FFV), and known examples include vehicles that can use gasoline and ethanol, either alone or as blends.

As blended fuels of gasoline and ethanol, there are used ethanol-blended gasoline fuels with a wide range of compositions, from E3 (blend of approximately 3% ethanol with approximately 97% gasoline, by volume ratio) to E85 (blend of approximately 85% ethanol with approximately 15% gasoline, by volume ratio). Internal combustion engines for flexible fuel vehicles must carry out combustion optimized for such a wide range of compositions.

In this regard, since ethanol has different properties from gasoline, a means has been devised by which the ethanol-blended gasoline fuel is stored in the main fuel tank, and the ethanol-rich fuel or gasoline-rich fuel is separated by a fuel separator, the fuels being selectively supplied to the internal combustion engine based on the operating state of the internal combustion engine (Patent Document 1).

Because ethanol has a high boiling point and large latent heat of vaporization, it is difficult to form a combustible gaseous blend at the starting up of the internal combustion engine, and therefore ethanol has the drawback of a low start-up property for the internal combustion engine. On the other hand, ethanol has a high octane value, and therefore can minimize knocking in the high rotation/high load operational range of the internal combustion engine, and can allow the engine compression ratio to be increased.

The known methods of separating ethanol-blended gasoline fuels include separation by a polar separating membrane member, and especially separation by a pervaporation membrane. In separation using such a polar separating membrane member, the highly polar components such as ethanol preferentially permeate the membrane, and it is thereby possible to obtain fuel with enriched ethanol, for example, at the permeation side (Patent Documents 2 and 3).

CITATION LIST

Patent Documents

[Patent Document 1] Japanese Unexamined Patent Publication No. 2009-133212
[Patent Document 2] Japanese Unexamined Patent Publication No. 2009-150397
[Patent Document 3] Japanese Unexamined Patent Publication No. 2011-174391

DISCLOSURE OF THE INVENTION

Problems to be Solved by the Invention

As mentioned above, for use of an ethanol-blended gasoline fuel in an internal combustion engine for a flexible vehicle, a known method involves separation of ethanol-rich fuel from ethanol-blended gasoline fuel, and supply of the ethanol-blended gasoline fuel and the ethanol-rich fuel to the internal combustion engine based on the operating state.

According to the invention there is provided a fuel separation method that may be suitably used for ethanol-blended gasoline fuel.

Means for Solving the Problems

As a result of diligent research, the present inventors have devised an invention having the following aspects.

(1) A fuel separation method for a flexible fuel vehicle capable of using an ethanol-blended gasoline fuel comprising a non-aromatic high-volatile gasoline component, a non-aromatic low-volatile gasoline component, an aromatic gasoline component and an ethanol component, wherein auxiliary fuel is separated from the ethanol-blended gasoline fuel, the fuel separation method comprising the following steps (a) and (b):

(a) when the ethanol concentration of the ethanol-blended gasoline fuel stored in a main fuel tank is within a first ethanol concentration range, the ethanol-blended gasoline fuel is separated with a polar separating membrane member at a first separation temperature to obtain, at the permeation side of the membrane, a first auxiliary fuel that is enriched with the aromatic gasoline component and the ethanol component in comparison with the ethanol-blended gasoline fuel; and (b) when the ethanol concentration of the ethanol-blended gasoline fuel stored in the main fuel tank is within a second ethanol concentration range which is higher than the first ethanol concentration range, the ethanol-blended gasoline fuel is separated with the polar separating membrane member at a second separation temperature which is lower than the first separation temperature to obtain, at the permeation side of the membrane, a second auxiliary fuel that is enriched with the non-aromatic high-volatile gasoline components in comparison with the ethanol-blended gasoline fuel.

(2) The method according to (1) above, wherein the lower limit and upper limit of the first ethanol concentration range are 1 vol % or higher and 25 vol % or lower, respectively; and the lower limit and upper limit of the second ethanol concentration range are at least 20 vol % and 99 vol % or higher, respectively.

(3) The method according to (1) or (2) above, wherein the first separation temperature is higher than 95° C. and 200° C. or lower, and the second separation temperature is 65° C. or higher and 95° C. or lower.

(4) The method according to any one of (1) to (3) above, which comprises storing the first and second auxiliary fuels in a single sub fuel tank.

(5) The method according to any one of (1) to (3) above, which comprises storing the first and second auxiliary fuels in separate sub fuel tanks.

(6) The method according to any one of (1) to (5) above, which comprises returning the remainder of the ethanol-blended gasoline fuel from which the first and second auxiliary fuels have been separated, to the main fuel tank.

(7) The method according to any one of (1) to (6) above, which comprises supplying the remainder of the ethanol-blended gasoline fuel from which the first and second auxiliary fuels have been separated, to the internal combustion engine, without letting it flow through the main fuel tank.

(8) The method according to any one of (1) to (7) above, wherein the polar separating membrane member is provided with a porous base, and a polar coating on the porous base.

(9) A fuel separation method for a flexible fuel vehicle capable of using an ethanol-blended gasoline fuel comprising a non-aromatic low-volatile gasoline component, a non-aromatic high-volatile gasoline component, an aromatic gasoline component and an ethanol component, wherein auxiliary fuel is separated from the ethanol-blended gasoline fuel, the fuel separation method comprising the following step (c):

(c) when the ethanol concentration of the ethanol-blended gasoline fuel stored in the main fuel tank is within a second ethanol concentration range, the ethanol-blended gasoline fuel is separated with a polar separating membrane member or a non-polar separating membrane member, at a second separation temperature to obtain, at the permeation side of the membrane, a second auxiliary fuel that is enriched with the non-aromatic high-volatile gasoline components in comparison with the ethanol-blended gasoline fuel.

Effect of the Invention

According to the fuel separation method of the first and second aspects of the invention, it is possible to obtain an auxiliary fuel that is preferable for control of internal combustion engines, from an ethanol-blended gasoline fuel. According to the fuel separation method of the first aspect of the invention, in particular, it is possible to obtain an auxiliary fuel that is preferable for control of internal combustion engines, from ethanol-blended gasoline fuels with a wide compositional range.

BRIEF DESCRIPTION OF THE DRAWINGS

FIG. 8 is a diagram illustrating the membrane separation section used in Examples 1 and 2. Specifically.

EMBODIMENTS FOR CARRYING OUT THE INVENTION

[First Aspect of the Invention]

Figure 1:
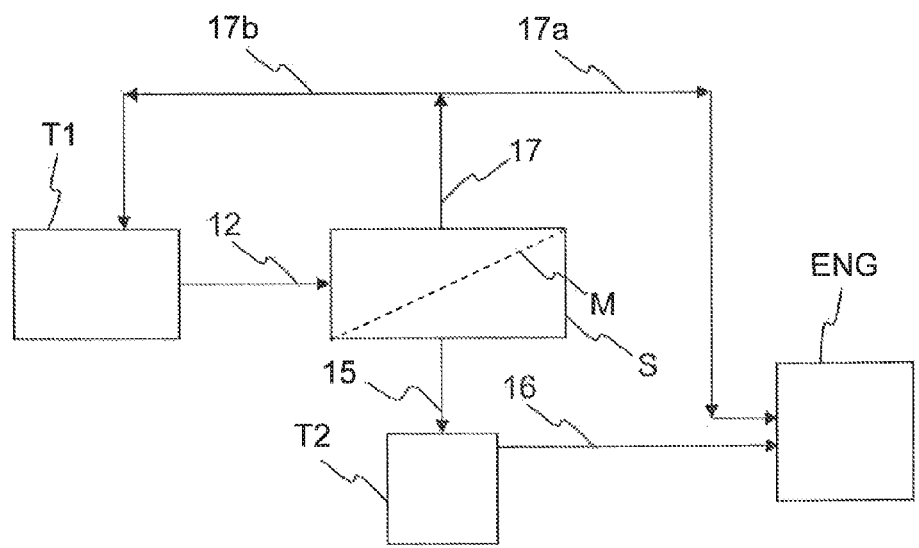
FIG. 1 is a diagram showing a device for carrying out the fuel separation method according to the first aspect of the invention.

In the fuel separation method according to the first aspect of the invention, auxiliary fuel is separated from an ethanol-blended gasoline fuel comprising a non-aromatic high-volatile gasoline component, a non-aromatic low-volatile gasoline component, an aromatic gasoline component and an ethanol component, for a flexible fuel vehicle capable of using the ethanol-blended gasoline fuel.

The method of the invention comprises the following steps (a) and (b).

In step (a) of the method, when the ethanol concentration of the ethanol-blended gasoline fuel stored in a main fuel tank is within a first ethanol concentration range, the ethanol-blended-gasoline fuel is separated with a polar separating membrane member at a first separation temperature to obtain, at the permeation side of the membrane, a first auxiliary fuel that is enriched with the aromatic gasoline component and the ethanol component in comparison with the ethanol-blended gasoline fuel.

In step (b) of the method, when the ethanol concentration of the ethanol-blended gasoline fuel stored in the main fuel tank is within a second ethanol concentration range which is higher than the first ethanol concentration range, the ethanol-blended gasoline fuel is separated with the polar separating membrane member at a second separation temperature which is lower than the first separation temperature to obtain, at the permeation side of the membrane, a second auxiliary fuel that is enriched with the non-aromatic high-volatile gasoline components in comparison with the ethanol-blended gasoline fuel.

According to the method of the invention, "non-aromatic high-volatile gasoline component" means a component that has higher volatility than the "non-aromatic low-volatile gasoline components" among the non-aromatic components in gasoline, and it may refer to a C5 or lower non-aromatic component such as butane or pentane, for example. Also, "non-aromatic low-volatile gasoline component" means a component that has lower volatility than the "non-aromatic high-volatile gasoline components" among the non-aromatic components in gasoline, and it may refer to a C6 or greater non-aromatic component such as cyclohexane or isooctane, for example. The term "aromatic gasoline component" means an aromatic component in gasoline, and it may refer to components with benzene rings, such as toluene, for example. The term "ethanol component" refers to ethanol.

In the fuel separation method according to the first aspect of the invention, when the ethanol concentration of ethanol-blended gasoline fuel in a main fuel tank is low, the difference in permeability of each of the components through the polar separating membrane member is utilized in step (a) to separate the first auxiliary fuel from the ethanol-blended gasoline fuel. Also, in the fuel separation method according to the first aspect of the invention, when the ethanol concentration of ethanol-blended gasoline fuel in a main fuel tank is high, the difference in vapor pressure of each of the components is utilized in step (b) to separate the second auxiliary fuel from the ethanol-blended gasoline fuel. The ethanol concentration of the ethanol-blended gasoline fuel can be judged with an ethanol concentration sensor or the like, mounted on the main fuel tank.

With the fuel separation method of the invention, whether the ethanol concentration of the ethanol-blended gasoline fuel in a main fuel tank is high or low, it is possible to appropriately make use of the ethanol-blended gasoline fuel, and auxiliary fuel separated from the blended fuel, according to the purpose.

In other words, in steps (a) and (b) of the method of the first aspect of the invention, for example, as illustrated in FIG. 1, ethanol-blended gasoline fuel from a main fuel tank (T1) is supplied to a separator (S) (12), and at the separator (S), it is separated by a polar separating membrane member (M) to generate auxiliary fuel (15) at the permeation side. The auxiliary fuel is stored in a sub fuel tank (T2), and is optionally supplied to an internal combustion engine (ENG) (16). Also, the portion (17) that has not permeated the polar separating membrane member (M) may be supplied to the internal combustion engine (ENG) without being returned to the main fuel tank (T1) (17a), or it may be returned to the main fuel tank (T1) (17b).

In FIG. 1, the first and second auxiliary fuels are stored in the same sub fuel tank, but the auxiliary fuels may instead be stored in separate sub fuel tanks.

(Step (a))

Step (a) is carried out when the ethanol concentration of the ethanol-blended gasoline fuel in the main fuel tank is in the first ethanol concentration range, i.e. a low concentration range.

The lower limit of the first ethanol concentration range can be determined as the concentration below which the first auxiliary fuel with enriched ethanol component is not efficiently obtained even by membrane separation. Specifically, the lower limit of the first ethanol concentration range may be 1 vol % (E1) or higher, 3 vol % (E3), or higher or 5 vol % (E5) or higher.

The upper limit of the first ethanol concentration range may be determined as the concentration above which the ethanol-blended gasoline fuel itself has a sufficient antiknock quality even without conducting separation.

Specifically, the upper limit of the first ethanol concentration range may be 25 vol % (E20) or lower, 20 vol % (E20) or lower, 15 vol % (E15) or lower, or 10 vol % (E10) or lower.

When the ethanol concentration is in the first ethanol concentration range, the ethanol-blended gasoline fuel of the main fuel tank has a relatively high vapor pressure similar to ordinary gasoline fuel, and therefore it can be suitably used to start an internal combustion engine. On the other hand, the blended gasoline fuel has a low octane value in comparison with ethanol, and therefore depending on the operating state, it may not be possible to provide a sufficient antiknock quality.

However, by membrane separation of the ethanol-blended gasoline fuel in step (a), it is possible to obtain, on the permeation side of the membrane, a first auxiliary fuel that is enriched with the aromatic gasoline component and ethanol component in comparison with the ethanol-blended gasoline fuel before separation. By being enriched with the aromatic gasoline component and ethanol component, the first auxiliary fuel has a higher octane value than the ethanol-blended gasoline fuel before separation, and it therefore has an excellent antiknock quality. This is conceptually illustrated in FIG. 2.

Figure 2:
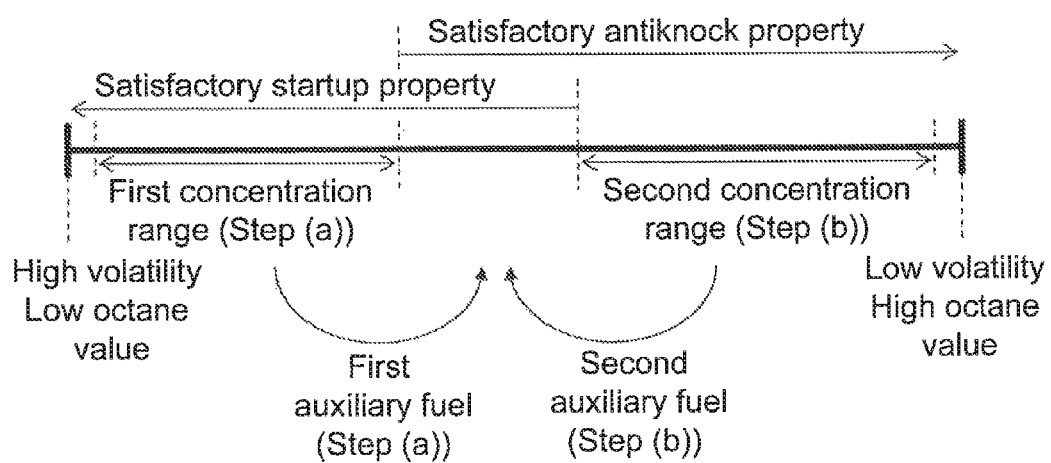
FIG. 2 is a diagram conceptually illustrating the fuel separation method according to the first aspect of the invention.

That is, as shown in FIG. 2, when the ethanol concentration of the ethanol-blended gasoline fuel in the main fuel tank is low, the first auxiliary fuel is obtained in the manner of step (a), thereby allowing the ethanol-blended gasoline fuel to be suitably utilized at start-up, and allowing the auxiliary fuel to be suitably utilized during antiknock control. During normal operation, either or both the ethanol-blended gasoline fuel and/or auxiliary fuel may be used.

The "Reid vapor pressure" is a parameter known for evaluating, volatility as an index for start-up of an internal combustion engine, and it is the vapor pressure measured when a sample cooled to about 0° C. has been enclosed in a test container and the test container has been heated to 37.8° C. For start-up of an internal combustion engine, and especially start-up of an internal combustion engine with a low ambient temperature, the value of the vapor pressure must be somewhat high.

(Step (a)—Membrane Separation Principle)

In step (a), use of a high first separation temperature makes it possible to obtain, on the permeation side of the membrane, a first auxiliary fuel that is enriched with the aromatic gasoline component and ethanol component in comparison with the ethanol-blended gasoline fuel before separation.

Figure 3:
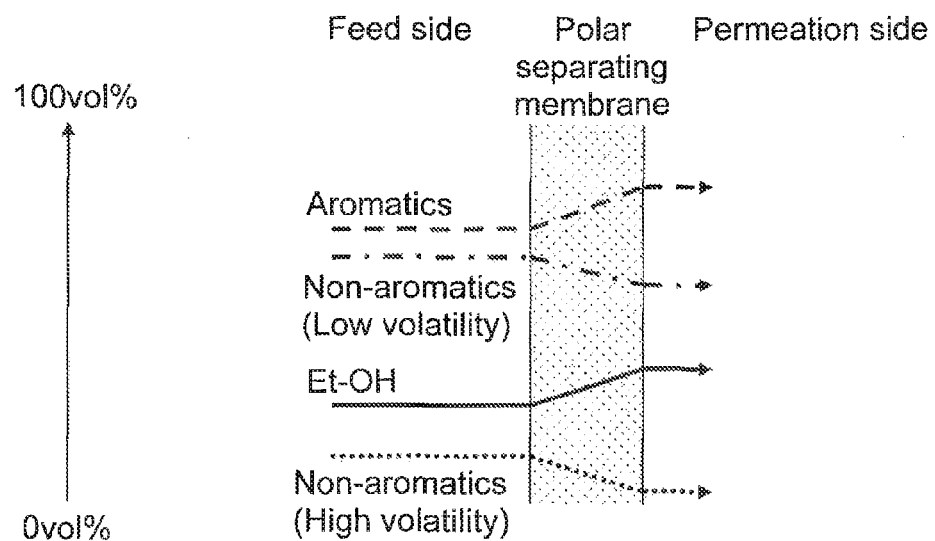
FIG. 3 is a diagram conceptually illustrating the principle of membrane separation in step (a) of the fuel separation method according to the first aspect of the invention.

In step (a), the selectivity of the polar separating membrane member allows the highly polar ethanol component and aromatic components to preferentially permeate the membrane, as shown in FIG. 3. Also, since a high first separation temperature is used for the membrane separation in step (a), all of the components in the blended gasoline fuel have high vapor pressure, and therefore as shown in FIG. 3, there is little or essentially no change in concentration due to vapor pressure difference at the permeation side.

The first separation temperature can be determined as a temperature at which all of the components in the blended gasoline fuel have high vapor pressure, such that there is little or essentially no change in concentration due to vapor pressure difference at the permeation side. Specifically, the first separation temperature may be higher than 95° C., 100° C. or higher, 105° C. or higher or 110° C. or higher. First separation temperature may also be 200° C. or lower, 150° C. or lower, 130° C. or lower, or 120° C. or lower. To determine the first separation temperature, it is necessary to also consider the degree of pressure reduction at the permeation side of the polar separating membrane member, and generally a low temperature may be used for a large degree of pressure reduction.

(Step (b))

Step (b) is carried out when the ethanol concentration of the ethanol-blended gasoline fuel in the main fuel tank is in the second ethanol concentration range, i.e. a high concentration range.

The lower limit of the second ethanol concentration range may be determined as the concentration below which the ethanol-blended gasoline fuel itself has sufficient volatility even without conducting separation. Specifically, the lower limit of the second ethanol concentration range may be higher than 20 vol % (E20), 25 vol % (E25) or higher, 30 vol % (E30) or higher, 35 vol % (E35) or higher, or 40 vol % (E40) or higher.

The upper limit of the second ethanol concentration range can be determined as the concentration above which the second auxiliary fuel that is enriched with the non-aromatic high-volatile gasoline component is not efficiently obtained even by membrane separation. Specifically, the upper limit of the second ethanol concentration range may be 99 vol % (E99) or lower, 95 vol % (E95) or lower, 90 vol % (E90) or lower, or 85 vol % (E85) or lower.

When the ethanol concentration is in the second ethanol concentration range, the ethanol-blended gasoline fuel of the main fuel tank has a higher octane value than ordinary gasoline fuel, and it therefore has an excellent antiknock quality. On the other hand, the blended gasoline fuel has lower volatility in comparison with ordinary gasoline fuel, and therefore may not have the vapor pressure necessary for start-up of an internal combustion engine.

However, by membrane separation of the ethanol-blended gasoline fuel in step (b), it is possible to obtain, on the permeation side of the membrane, a second auxiliary fuel that is enriched with the non-aromatic high-volatile gasoline component in comparison with the ethanol-blended gasoline fuel. The second auxiliary fuel, by being enriched with the non-aromatic high-volatile gasoline component, has a higher vapor pressure than the ethanol-blended gasoline fuel before separation, and it can therefore be suitably used for start-up of an internal combustion engine. This is conceptually illustrated in FIG. 2.

That is, as shown in FIG. 2, when the ethanol concentration of the ethanol-blended gasoline fuel in the main fuel tank is high, the ethanol-blended gasoline fuel can be suitably utilized during antiknock control; while the auxiliary fuel can be suitably utilized at start-up, in step (b). During normal operation, either or both the ethanol-blended gasoline fuel and/or auxiliary fuel may be used.

(Step (b)—Membrane Separation Principle)

In step (b), use of a low second separation temperature makes it possible to obtain, on the permeation side of the membrane, a second auxiliary fuel that is enriched with the non-aromatic high volatile component in comparison with the ethanol-blended gasoline fuel before separation.

Figure 4:
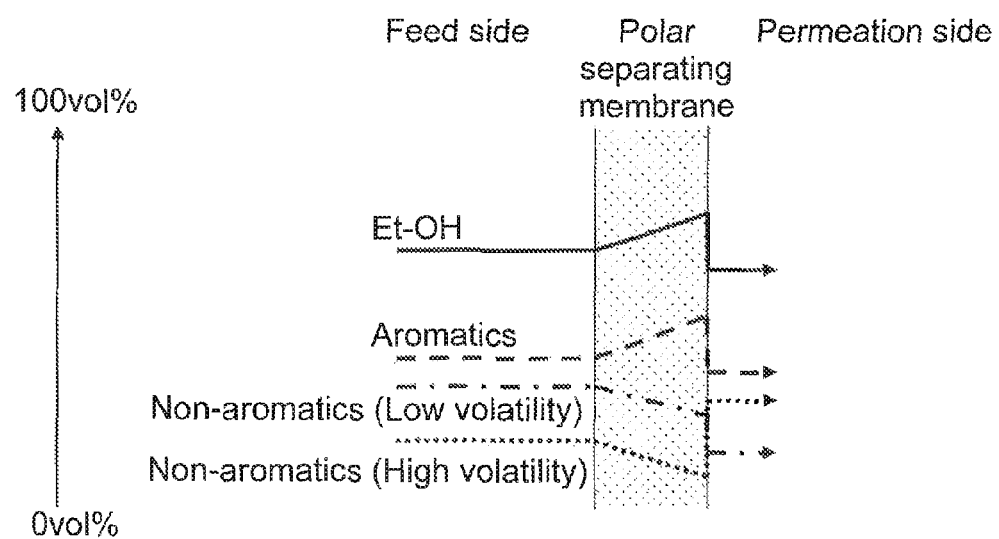
FIG. 4 is a diagram conceptually illustrating the principle of membrane separation in step (b) of the fuel separation method according to the first aspect of the invention, and the principle of membrane separation in the fuel separation method according to the second aspect of the invention.

The selectivity of the polar separating membrane member for each of the components of the blended gasoline fuel in step (b) allows the highly polar ethanol component and aromatic components to preferentially permeate the membrane, similar to step (a), as shown in FIG. 4.

However, since a low temperature is used for the membrane separation in step (b), the non-aromatic low-volatile gasoline components, the aromatic gasoline components and the ethanol component in the blended gasoline fuel have low vapor pressure, as shown in FIG. 4, whereas the non-aromatic high-volatile gasoline components in the blended gasoline fuel have high vapor pressure. Consequently, the ethanol component and other components with low vapor pressure do not easily gasify on the permeation side, and their concentration on the permeation side is reduced. In contrast, the non-aromatic high-volatile gasoline components with high vapor pressure easily gasify on the permeation side, and their concentration on the permeation side is relatively increased.

The second separation temperature may be determined as the temperature at which the non-aromatic high-volatile gasoline components have high vapor pressure and the other components such as the ethanol component have low vapor pressure, whereby the non-aromatic high-volatile gasoline components are selectively gasified. Specifically, the second separation temperature may be 65° C. or higher, 70° C. or higher, 75° C. or higher, 80° C. or higher, or 85° C. or higher. The second separation temperature may also be 95° C. or lower, 90° C. or lower, or 85° C. or lower. To determine the second separation temperature, it is necessary to also consider the degree of pressure reduction at the permeation side of the polar separating membrane member, and generally a low temperature may be used for a large degree of pressure reduction.

Figure 5:
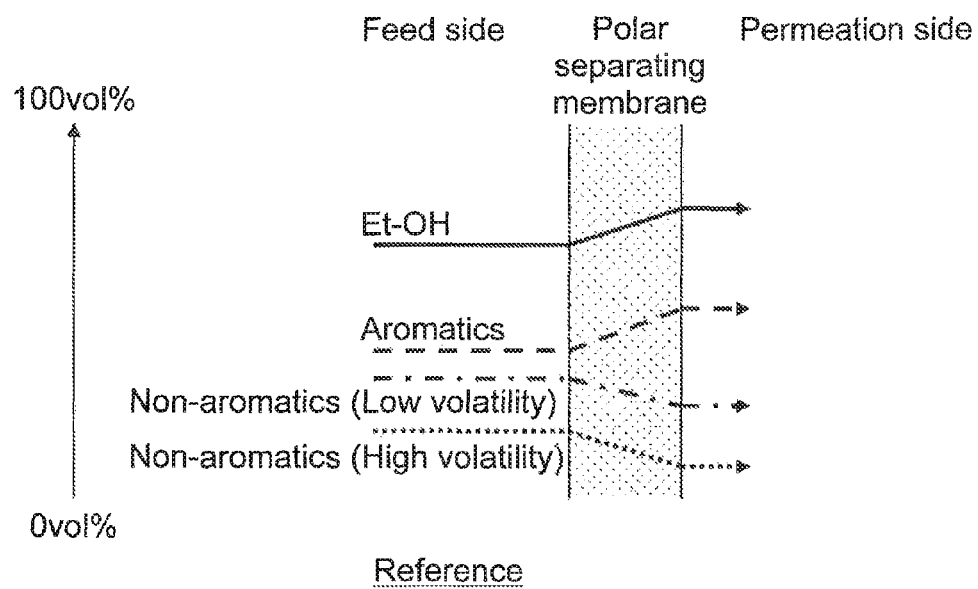
FIG. 5 is a diagram (reference) conceptually illustrating the principle of membrane separation carried out in the same manner as step (b) of the fuel separation method according to the first aspect of the invention, except for using a high membrane separation temperature.

For reference, when separation is carried out in the same manner as step (b) except for using a high separation temperature, all of the components in the blended gasoline fuel have high vapor pressure, as shown in FIG. 5, and therefore the differences due to their degree of gasification are reduced or essentially eliminated, making it impossible to enrich the non-aromatic high volatile components.

(Polar Separating Membrane Member)

A polar separating membrane member that can be used in the method of the invention may be any polar separating membrane member capable of preferentially permeating an aromatic gasoline component and ethanol component due to their polarities, when it has contacted with an ethanol-blended gasoline fuel comprising a non-aromatic high-volatile gasoline component, non-aromatic low-volatile gasoline component, aromatic gasoline component and ethanol component.

Such polar separating membrane members themselves are known, and are disclosed in Patent Documents 2 and 3, for example.

Figure 6:
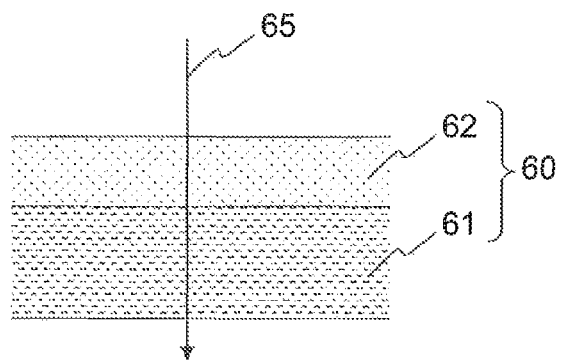
FIG. 6 is a diagram illustrating an example of the structure of a polar membrane separation member that can be used for the fuel separation method according to the first aspect of the invention.

A polar separating membrane member that can be used in the method of the invention may have any desired structure, and for example, as shown in FIG. 6, the polar separating membrane member (60) may be provided with a porous base (61) and a polar coating (62) on the porous base (61), so that a portion of the blended gasoline fuel permeates it as indicated by the arrow (65). The porous base used may be a porous ceramic base such as porous zirconia, or preferably a porous ceramic monolith of cordierite as described in U.S. Patent Publication No. 2011/0300355 A1. The polar coating used may be a polar polymer coating such as polyethersulfone, or preferably an ethanol stable polymer such as epoxy based polyetheramnines as described in U.S. Pat. No. 8,119, 006 and U.S. Provisional Patent Application Ser. No. 61/476,988.

[Second Aspect of the Invention]

In the fuel separation method according to the second aspect of the invention, auxiliary fuel is separated from ethanol-blended gasoline fuel comprising a non-aromatic high-volatile gasoline component, a non-aromatic low-volatile gasoline component, an aromatic gasoline component and an ethanol component, for a flexible fuel vehicle capable of using the ethanol-blended gasoline fuel.

The method of the invention comprises the following step (c).

In step (c), when the ethanol concentration of the ethanol-blended gasoline fuel stored in the main fuel tank is within a second ethanol concentration range, the ethanol-blended gasoline fuel is separated with a polar or non-polar separating membrane member, at a second separation temperature to obtain, at the permeation side of the membrane, a second auxiliary fuel that is enriched with the non-aromatic high-volatile gasoline components in comparison with the ethanol-blended gasoline fuel.

In the fuel separation method according to the second aspect of the invention, when the ethanol concentration of ethanol-blended gasoline fuel in a main fuel tank is high, the difference in vapor pressure of each of the components is utilized in step (c) to separate the second auxiliary fuel from the ethanol-blended gasoline fuel.

With the fuel separation method of the invention, when the ethanol concentration of the ethanol-blended gasoline fuel in a main fuel tank is high, it is possible to appropriately make use of the ethanol-blended gasoline fuel, and auxiliary fuel separated from the blended fuel, according to the purpose.

(Non-Polar Separating Membrane Member)

A non-polar separating membrane member that can be used in the method according to the second aspect of the invention may be a separating membrane member that exhibits essentially no selective permeability due to their polarities, when it has contacted with an ethanol-blended gasoline fuel comprising a non-aromatic low-volatile gasoline component, non-aromatic high-volatile gasoline component, aromatic gasoline component and ethanol component.

Specifically, such non-polar separating membrane members themselves are known, and may be porous ceramic film members, for example.

Figure 7:
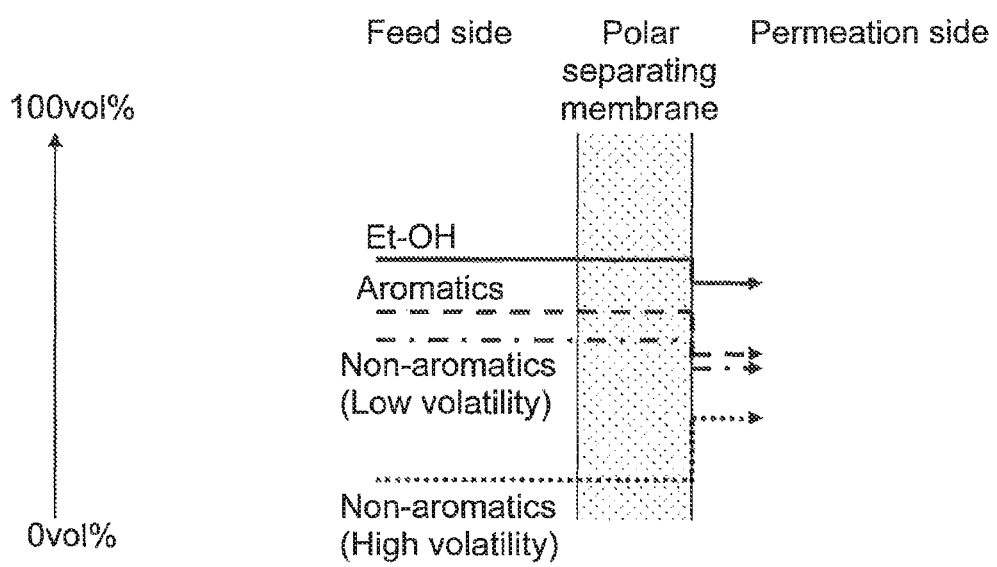
FIG. 7 is a diagram conceptually illustrating the principle of membrane separation in the fuel separation method according to the second aspect of the invention.

When such a non-polar separating membrane member is used in the method according to the second aspect of the invention, as shown in FIG. 7, the membrane member itself exhibits essentially no selectivity due to polarity, and the non-aromatic low-volatile gasoline components, the aromatic gasoline components and the ethanol component in the blended gasoline fuel have low vapor pressure, whereas the non-aromatic high-volatile gasoline components in the blended gasoline fuel have high vapor pressure. Consequently, the ethanol component and other components with low vapor pressure do not easily gasify, and their concentration on the permeation side is reduced. In contrast, the non-aromatic high-volatile gasoline components with high vapor pressure easily gasify, and their concentration on the permeation side is relatively increased.

(Other Details)

The other details of step (c) of the fuel separation method according to the second aspect of the invention may be found in the description for the fuel separation method according to the first aspect of the invention, and especially in the description for step (b).

EXAMPLES

In the examples below, the device shown in FIG. 8 was used to evaluate the temperature dependence for membrane separation of ethanol-blended gasoline fuel.

Figure 8A:
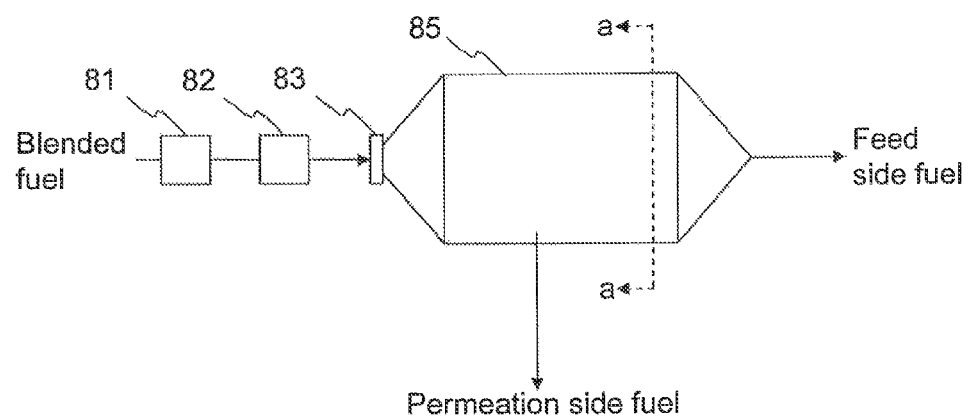
FIG. 8(a) is a side view of the membrane separation section.
Figure 8B:
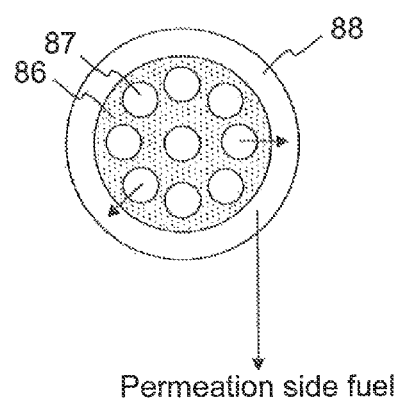
FIG. 8(b) is a cross-sectional view along line A-A of FIG. 8(a)
Figure 8C:
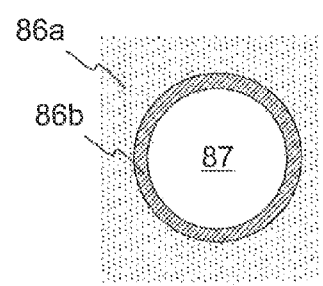
FIG. 8(c) is a magnified view of a portion of FIG. 8(b).

Specifically, in the device shown in FIG. 8, ethanol-blended gasoline fuel (blended fuel) is pressurized by a pump (81), and heated by a heating section (82), and then sprayed through a nozzle (83) to be supplied to a membrane separation section (85).

The blended gasoline fuel sprayed from the nozzle (83) is at least partially gasified into a gas-liquid multiphase flow, and flows through a feed side fluid channel (87) in the membrane separation section (85), during which time a portion of the blended gasoline fuel permeates the separating membrane member (86) and reaches a permeation side fluid channel (88), where it is recovered as permeation side fuel. In order to promote permeation of a portion of the blended gasoline fuel through the membrane member (86), the permeation side is subjected to pressure reduction with an eductor (also referred to as a "jet pump"), to approximately 0.2 atm.

Also, the portion of the blended gasoline fuel, which flows through the feed side fluid channel (87) of the membrane separation section but have not permeated the membrane member, keeps flowing through the feed side fluid channel (87) of the membrane separation section, and is recovered as feed side fuel.

The membrane member (86) comprises a porous ceramic material base (86*a*) and a polar polymer coating (86*b*) coated on the base at the wall faces of the feed side fluid channel (87).

Example 1

In this example, the device illustrated in FIG. 8 was used to separate an E10 ethanol-blended gasoline fuel, as a mixture of approximately 10 vol % ethanol and approximately 90 vol % gasoline, at a separation temperature of 148° C. The polar separating membrane member used consisted of a D400-DENO aliphatic epoxy crosslinked polyetheramine on a porous ceramic support, as described in U.S. Provisional Patent Application Ser. No. 61/476,988. The evaluation results are shown in Table 1 below.

TABLE 1

Results of membrane separation of E10 fuel at 148° C.

|  |  | Before membrane separation (wt %) | After membrane separation (wt %) | |
|---|---|---|---|---|
|  |  |  | Permeation side | Feed side |
| Component | Non-aromatic high-volatility gasoline components | 17 | 9 | 19 |
|  | Non-aromatic low-volatility gasoline components | 52 | 37 | 57 |
|  | Aromatic gasoline components | 21 | 29 | 19 |
|  | Ethanol component | 10 | 4 | 5 |
| Evaluation | Total Yield (wt %) | 100 | 24 | 76 |
|  | Reid vapor pressure (psi) | 8 | 5 | 9 |
|  | Octane value (RON*) | Medium (92) | High (101) | Low (69) |

RON*: Research Octane Number

As clearly seen in Table 1, membrane separation at a relatively high temperature of 148° C. in Example 1 made it possible to increase the proportion of aromatic gasoline components and ethanol component, and thereby increase the octane value, in the blended gasoline fuel obtained at the permeation side of the membrane.

Example 2

In this example, the device illustrated in FIG. 8 was used to separate an E70 ethanol-blended gasoline fuel, as a mixture of approximately 70 vol % ethanol and approximately 30 vol % gasoline, at a separation temperature of 85° C. The evaluation results are shown in Table 2 below.

TABLE 2

Results of membrane separation of E70 fuel at 85° C.

|  |  | Before membrane separation (wt %) | After membrane separation (wt %) | |
|---|---|---|---|---|
|  |  |  | Permeation side | Feed side |
| Component | Non-aromatic high-volatility gasoline components | 6 | 8 | 5 |
|  | Non-aromatic low-volatility gasoline components | 17 | 9 | 20 |
|  | Aromatic gasoline components | 10 | 5 | 11 |
|  | Ethanol component | 67 | 78 | 64 |
| Evaluation | Total Yield (wt %) | 100 | 27 | 73 |
|  | Reid vapor pressure (psi) | 5.6 | 7.5 | 5.5 |
|  | Octane value | High | High | High |

As clearly seen in Table 2, membrane separation at a relatively low temperature of 85° C. in Example 2 made it possible to increase the proportion of non-aromatic high-volatile gasoline components, and thereby increase the Reid vapor pressure value, in the blended gasoline fuel obtained at the permeation side of the membrane.

Incidentally, since the Reid vapor pressure is approximately 8 psi with low-ethanol gasoline such as E10 blended gasoline fuel, it is apparent that the membrane separation brought the Reid vapor pressure value to near that of low-ethanol gasoline.

EXPLANATION OF SYMBOLS

T1 Main fuel tank
T2 Sub fuel tank
M Separating membrane member
S Separator
ENG Internal combustion engine
60 Polar separating membrane member
61 Porous base
62 Polar coating
81 Pump
82 Heating section
83 Nozzle
86 Membrane member
87 Feed side fluid channel
88 Permeation side fluid channel

The invention claimed is:

1. A fuel separation method for a flexible fuel vehicle capable of using an ethanol-blended gasoline fuel comprising a non-aromatic high-volatile gasoline component, a non-aromatic low-volatile gasoline component, an aromatic gasoline component and an ethanol component, wherein auxiliary fuel is separated from the ethanol-blended gasoline fuel, the fuel separation method comprising:

measuring an ethanol concentration of the ethanol-blended gasoline fuel stored in a main fuel tank, wherein (a) when the ethanol concentration is measured to be within a first ethanol concentration range, the ethanol-blended gasoline fuel is separated with a polar separating membrane member at a first separation temperature to obtain, at the permeation side of the membrane, a first auxiliary fuel that is enriched with the aromatic gasoline component and the ethanol component in comparison with the ethanol-blended gasoline fuel; and (b) when the ethanol concentration is measured to be within a second ethanol concentration range which is higher than the first ethanol concentration range, the ethanol-blended gasoline fuel is separated with the polar separating membrane member at a second separation temperature which is lower than the first separation temperature to obtain, at the permeation side of the membrane, a second auxiliary fuel that is enriched with the non-aromatic high-volatile gasoline components in comparison with the ethanol-blended gasoline fuel.

2. The method according to claim 1, wherein the lower limit and upper limit of the first ethanol concentration range are 1 vol % or higher and 25 vol % or lower, respectively; and the lower limit and upper limit of the second ethanol concentration range are at least 20 vol % and 99 vol % or higher, respectively.

3. The method according to claim 1, wherein the first separation temperature is higher than 95° C. and 200° C. or lower, and the second separation temperature is 65° C. or higher and 95° C. or lower.

4. The method according to claim 1, which comprises storing the first and second auxiliary fuels in a single sub fuel tank.

5. The method according to claim 1, which comprises storing the first and second auxiliary fuels in separate sub fuel tanks.

6. The method according to claim 1, which comprises returning the remainder of the ethanol-blended gasoline fuel from which the first and second auxiliary fuels have been separated, to the main fuel tank.

7. The method according to claim 1, which comprises supplying the remainder of the ethanol-blended gasoline fuel from which the first and second auxiliary fuels have been separated, to the internal combustion engine, without letting it flow through the main fuel tank.

8. The method according to claim 1, wherein the polar separating membrane member is provided with a porous base, and a polar coating on the porous base.

* * * * *